US009663035B2

(12) United States Patent
Nakata et al.

(10) Patent No.: US 9,663,035 B2
(45) Date of Patent: May 30, 2017

(54) IMAGE PROCESSING APPARATUS, IMAGING APPARATUS, VEHICLE DRIVE ASSISTING APPARATUS, AND IMAGE PROCESSING METHOD

(71) Applicant: KYOCERA CORPORATION, Kyoto (JP)

(72) Inventors: Takatoshi Nakata, Yokohama (JP); Hideyuki Seto, Kamo (JP); Takahiro Okada, Okazaki (JP)

(73) Assignee: KYOCERA Corporation, Kyoto (JP)

( * ) Notice: Subject to any disclaimer, the term of this patent is extended or adjusted under 35 U.S.C. 154(b) by 205 days.

(21) Appl. No.: 14/388,511

(22) PCT Filed: Mar. 26, 2013

(86) PCT No.: PCT/JP2013/002036
§ 371 (c)(1),
(2) Date: Sep. 26, 2014

(87) PCT Pub. No.: WO2013/145710
PCT Pub. Date: Oct. 3, 2013

(65) Prior Publication Data
US 2015/0062341 A1    Mar. 5, 2015

(30) Foreign Application Priority Data

Mar. 28, 2012    (JP) ................. 2012-075043

(51) Int. Cl.
*B60R 1/00*    (2006.01)
*G09G 5/00*    (2006.01)
(Continued)

(52) U.S. Cl.
CPC ............ *B60R 1/00* (2013.01); *B62D 15/0295* (2013.01); *G06T 11/001* (2013.01); *G06T 11/60* (2013.01);
(Continued)

(58) Field of Classification Search
None
See application file for complete search history.

(56) References Cited

U.S. PATENT DOCUMENTS

| 6,396,397 B1 * | 5/2002 | Bos ........................ B60N 2/002 180/167 |
| 8,988,250 B2 * | 3/2015 | Suzuki ..................... B60R 1/00 340/932.2 |

(Continued)

FOREIGN PATENT DOCUMENTS

| EP | 1102226 A2 | 5/2001 |
| JP | 2000-280822 A | 10/2000 |

(Continued)

OTHER PUBLICATIONS

The extended European search report issued by the European Patent Office on Nov. 6, 2015, which corresponds to European Patent Application No. 13769235.6-1904 and is related to U.S. Appl. No. 14/388,511.

(Continued)

*Primary Examiner* — Reza Aghevli
(74) *Attorney, Agent, or Firm* — Studebaker & Brackett PC

(57) ABSTRACT

An image processing apparatus includes: an image color determination unit configured to determine color of overlay image data to be superimposed on captured image data of successive frames generated by capturing surroundings of a vehicle such that a first color of overlay image data of a first frame differs from a second color of the overlay image data of a second frame following the first frame; and an image synthesizing unit configured to superimpose the overlay image data in the first color and the overlay image data in the second color respectively on predetermined positions in the captured image data of the first frame and the second frame, and output images corresponding to the captured image data (Continued)

of the successive frames one after another to a display. Thereby, an overlay image that is easily visible regardless of background color and driver's color vision is superimposed on a captured image.

8 Claims, 9 Drawing Sheets

(51) Int. Cl.
*G09G 5/02* (2006.01)
*H04N 7/18* (2006.01)
*G06T 11/00* (2006.01)
*G06T 11/60* (2006.01)
*G08G 1/0962* (2006.01)
*B62D 15/02* (2006.01)
*G09G 5/377* (2006.01)

(52) U.S. Cl.
CPC ............. *G08G 1/0962* (2013.01); *G09G 5/00* (2013.01); *B60R 2300/304* (2013.01); *B60R 2300/308* (2013.01); *B60R 2300/802* (2013.01); *G09G 5/02* (2013.01); *G09G 5/377* (2013.01); *G09G 2340/12* (2013.01); *G09G 2340/14* (2013.01); *H04N 7/18* (2013.01)

(56) References Cited

U.S. PATENT DOCUMENTS

| | | | |
|---|---|---|---|
| 2002/0128754 A1 | 9/2002 | Sakiyama et al. | |
| 2002/0135468 A1* | 9/2002 | Bos | B60N 2/002 340/436 |
| 2002/0186865 A1* | 12/2002 | Retterath | G01N 21/55 382/104 |
| 2005/0086000 A1* | 4/2005 | Tsuchiya | G08G 1/166 701/538 |
| 2011/0032357 A1* | 2/2011 | Kitaura | B60R 1/00 348/148 |
| 2012/0062743 A1* | 3/2012 | Lynam | B60Q 9/005 348/148 |

FOREIGN PATENT DOCUMENTS

| | | | | |
|---|---|---|---|---|
| JP | 2005-073203 A | | 3/2005 | |
| JP | 2008-193521 A | | 8/2008 | |
| JP | 2010-109684 | * | 10/2008 | ............... H04N 7/18 |
| JP | 2010-018102 A | | 1/2010 | |
| JP | 2010-109684 A | | 5/2010 | |

OTHER PUBLICATIONS

International Search Report; PCT/JP2013/002036; May 21, 2013.
Written Opinion of the International Searching Authority; PCT/JP2013/002036; May 21, 2013; with English language concise explanation.

\* cited by examiner

FIG. 3
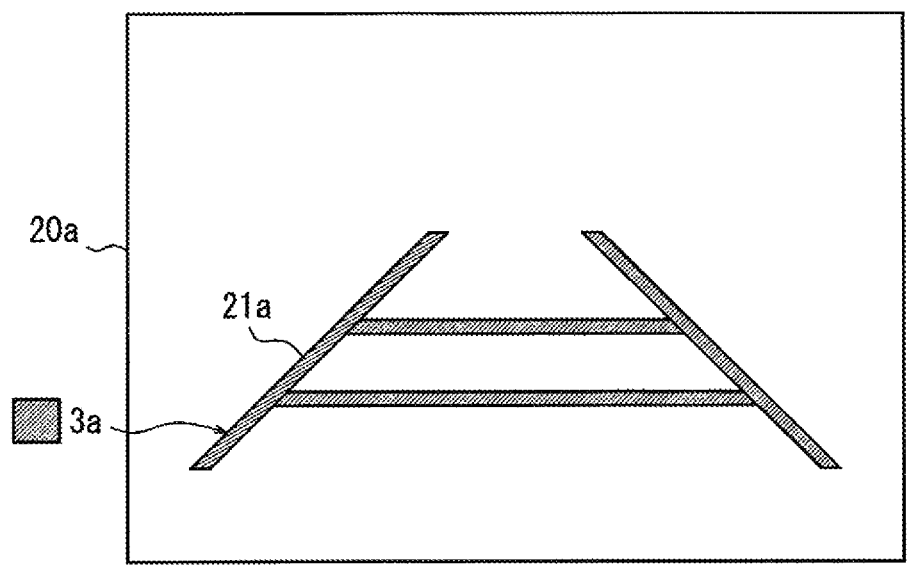
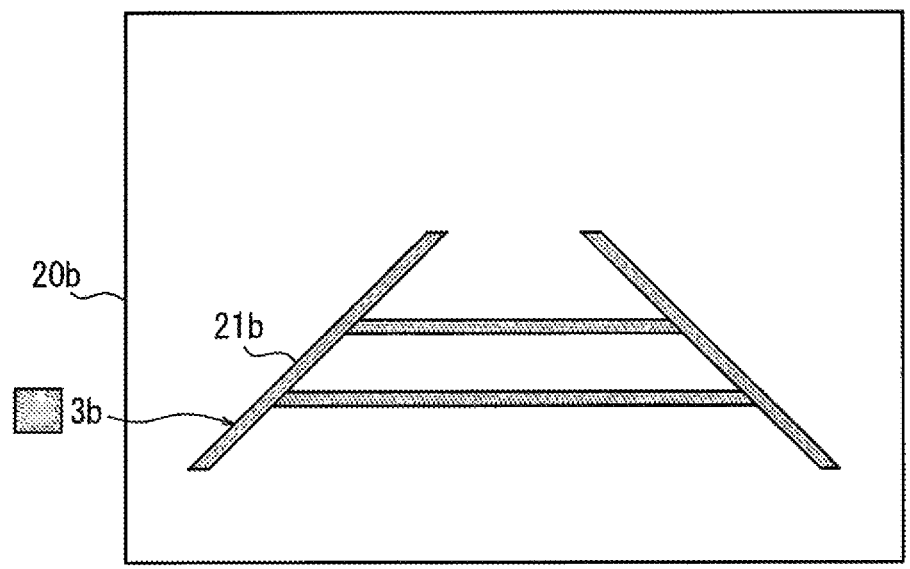

FIG. 9

| Pattern number | Reference color | | Opposite color | |
|---|---|---|---|---|
| | Color | Brightness (%) | Color | Brightness (%) |
| 1 | Yellow | 80 | Blue | 20 |
| 2 | Red | 70 | Green | 20 |
| 3 | Orange | 60 | Bluish green | 30 |
| 4 | Magenta | 50 | Yellowish green | 30 |

IMAGE PROCESSING APPARATUS, IMAGING APPARATUS, VEHICLE DRIVE ASSISTING APPARATUS, AND IMAGE PROCESSING METHOD

CROSS REFERENCE TO RELATED APPLICATION

This application claims priority to and the benefit of Japanese Patent Application No. 2012-075043 (filed on Mar. 28, 2012), the entire contents of which are incorporated herein by reference.

TECHNICAL FIELD

The present invention relates to an image processing apparatus for superimposing overlay image data on captured image data of successive frames generated by capturing surroundings of a vehicle, and also to an imaging apparatus, a vehicle drive assisting apparatus, and an image processing method.

BACKGROUND

There is known a vehicle drive assisting apparatus that, during running of a vehicle, displays an image of surroundings of the vehicle captured by an imaging apparatus mounted on the vehicle on a display installed in the vehicle. A driver, by checking a captured image displayed on the display, may recognize obstacles around the vehicle while driving the vehicle and also, in parking, easily and accurately park the vehicle in a parking space. Further, some examples of the vehicle drive assisting apparatus display the captured image of the surroundings of the vehicle including an image serving as a drive assisting guide superimposed thereon (for example, Patent Documents 1, 2). The image superimposed on the captured image (hereinafter, referred to as an overlay image) is, for example, a predicted path guide line of the vehicle. The captured image having the overlay image superimposed thereon allows the driver to more accurately and easily recognize a distance between the vehicle and an object as well as a width of the vehicle.

RELATED ART DOCUMENTS

Patent Documents

Patent Document 1: Japanese Patent Application Laid-Open Publication No. 2005-073203
Patent Document 2: Japanese Patent Application Laid-Open Publication No. 2008-193521

SUMMARY OF INVENTION

The overlay image, for its purpose, preferably stands out as much as possible against the captured image displayed as a background. As such, the overlay image is generally in color such as, for example, yellow and red for easy recognition to the driver. However, when the background having the overlay image superimposed thereon are in color similar to that of the overlay image, there is a risk that the overlay image becomes less visible. In particular, people with color blindness may have further difficulty in recognizing the overlay image in colors which they have difficulty in recognizing.

Therefore, the present invention in consideration of the above problem is to provide an image processing apparatus for superimposing, on the captured image, the overlay image that is easily visible regardless of the background color and a driver's color vision, and also to provide an imaging apparatus, a drive assisting apparatus, and an image processing method.

In order to solve the above problem, an image processing apparatus according to one embodiment of the present invention includes: an image color determination unit configured to determine color of overlay image data to be superimposed on captured image data of successive frames generated by capturing surroundings of a vehicle such that a first color of overlay image data of a first frame differs from a second color of the overlay image data of a second frame following the first frame; and an image synthesizing unit configured to superimpose the overlay image data in the first color and the overlay image data in the second color respectively on predetermined positions in the captured image data of the first frame and the second frame, and output images corresponding to the captured image data of the successive frames one after another to a display.

The first color and second colors are determined to have a difference in at least one of hue, brightness, and intensity.

According to another preferred embodiment, the first and second colors are determined to be complementary to each other.

According to yet another preferred embodiment, the image color determination unit includes a plurality of selectable combinations of the first and second colors.

According to another embodiment of the present invention, an imaging apparatus includes the image processing apparatus described above and an imaging unit for capturing surroundings of a vehicle and generating captured image data to be input to the image processing apparatus.

According to yet another embodiment of the present invention, a vehicle drive assisting apparatus includes the imaging apparatus described above and a display installed in a vehicle together with the imaging apparatus for displaying images corresponding to captured image data of successive frames output from the imaging apparatus.

Note that a method, a program, and a storage medium storing the program that are substantially corresponding to the above apparatus may also implement the present invention and thus included in the scope of the present invention. For data processing, each step of the method or the program, as necessary, uses a processer such as CPU (Central Processing Unit) and DSP (Digital Signal Processor) and stores input data, processed data, generated data and the like in a storage device such as HDD (Hard Disk Drive) and a memory.

For example, an image processing method for implementing the present invention as a method includes steps of: determining color of overlay image data to be superimposed on captured image data of successive frames generated by capturing surroundings of a vehicle such that a first color of overlay image data of a first frame differs from a second color of the overlay image data of a second frame following the first frame; superimposing the overlay image data in the first color and the overlay image data in the second color respectively on predetermined positions in the captured image data of the first frame and the second frame; and outputting images corresponding to the captured image data of the successive frames one after another to a display.

According to the present invention, an overlay image that is easily visible regardless of a background color and a driver's color vision may be superimposed on a captured image.

BRIEF DESCRIPTION OF DRAWINGS

FIG. 3 is a diagram illustrating color of overlay image data;

FIG. 9 is a diagram illustrating exemplary color combinations of the overlay image data to be selected.

DESCRIPTION OF EMBODIMENT

Hereinafter, a preferred embodiment of the present invention will be described in detail by way of example with reference to the accompanying drawings.

Figure 1:
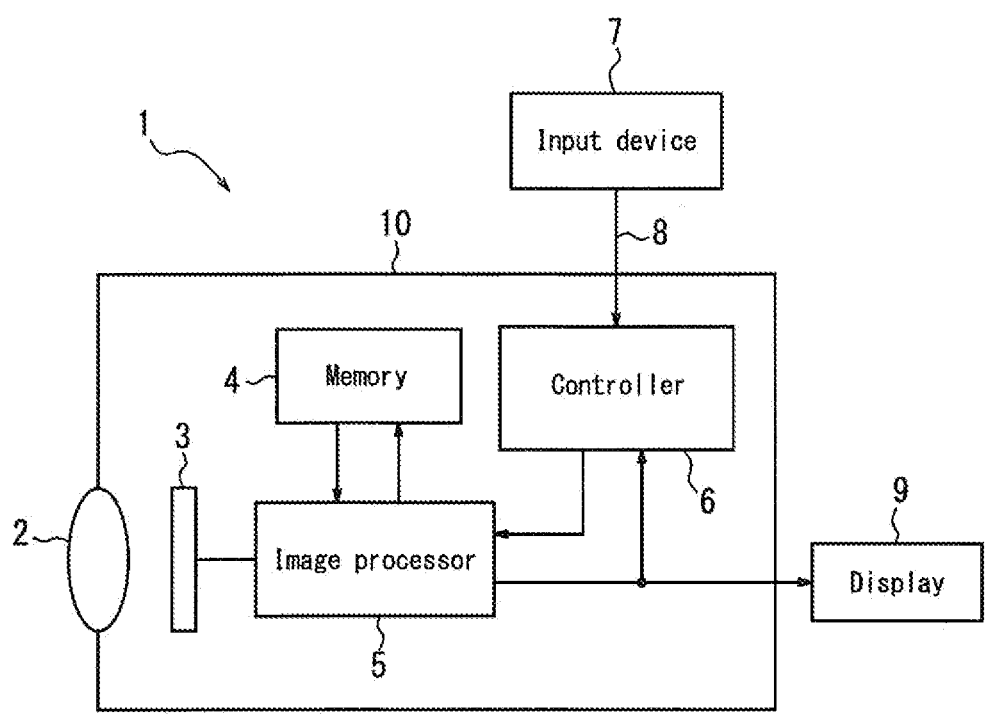
FIG. 1 is a diagram illustrating a configuration of a vehicle drive assisting apparatus of the present embodiment.

FIG. 1 is a diagram illustrating a configuration of a vehicle drive assisting apparatus of the present embodiment. A drive assisting apparatus 1 installed in a vehicle includes an imaging apparatus 10 for capturing surroundings of the vehicle and a display 9 for displaying a captured image. The drive assisting apparatus 1 may further include an input device 7 for receiving an input operation from a driver. The imaging apparatus 10 includes an imaging optical system 2, an imaging unit 3, a memory (storage) 4, an image processor 5, and a controller 6. The imaging apparatus 10 is mounted, for example, on a rear portion of the vehicle and captures an image of surroundings behind the vehicle.

The imaging optical system 2 is an optical member for allowing light (i.e., an optical image of the surroundings of the vehicle) to enter the imaging unit 3. For example, the imaging optical system 2 includes one or more lenses. Also, the imaging optical system 2 may include, in addition to the lens(es), other optical members such as a filter and the like arranged in such a manner that optical axes thereof coincide with one another.

The imaging unit 3 is mounted on the vehicle and captures an image of the surroundings of the vehicle through the imaging optical system 2 and includes, for example, CCD (Charge Coupled Device) image sensor or CMOS (Complementary Metal Oxide Semiconductor) image sensor that include image pickup elements arranged in a two-dimensional manner for converting an optical image taken by the imaging optical system 2 into an electrical signal. For example, the imaging unit 3 successively images at intervals of several tens of milliseconds and outputs a pixel signal corresponding to two-dimensional pixels in each of the imaging operation. Here, one imaging captures an image of one frame. Then, by the successive imaging operation, moving images composed of the captured images of successive frames are captured. Between the imaging unit 3 and the image processor 5, an A/D converter (not shown) for converting an analog output of the imaging unit 3 into a digital signal is provided. Captured image data converted into the digital signal constitute a pixel data group of each frame. Thus, the captured image data of the successive frames are input to the image processor 5.

The image processor 5 corresponds to an "image processing device" for overlapping overlay image data on the captured image data and outputting the resulting data to the display 9. The image processor 5 is constituted by using, for example, MPU (Micro Processor Unit) or LSI (Large Scale Integration).

The memory 4 stores the overlay image data to be superimposed on the captured image data. The overlay image data are, for example, image data corresponding to a vehicle predicted path guide line. Here, the guide line is displayed overlapping the captured image in order to assist drive of the vehicle and includes, for example, a guide line indicating a vehicle predicted path trajectory, a guide line indicating a distance from the vehicle, and a guide line indicating a width of the vehicle. The guide lines may be either a straight line or a curved line. Also, a plurality of patterns of the guide line may be preliminarily stored in the memory 4 and changed based on a behavior of the vehicle such as a steering angle of the vehicle, a rotation speed difference between a left wheel and a right wheel, and a velocity of the vehicle.

The controller 6 obtains a command signal from the input device 7 and a sensor signal from various sensors mounted on the vehicle and accordingly outputs a control signal for controlling operations of the imaging unit 3 and the image processor 5. The command signal from the input device 7 is, for example, a command to display a guide line image or a signal for setting color of the guide line image (i.e., an overlay image). The controller 6 is constituted by using, for example, the MPU (Micro Processor Unit) or the LSI (Large Scale Integration).

The input device 7 is installed in the vicinity of a driver's seat and, by receiving various input operations from the driver, generates command signals corresponding to the input operations. The input device 7 is constituted by using, for example, a keyboard or a touch panel. The command signal from the input device 7 is transmitted to the controller 6 via a line 8. The line 8 may be an in-vehicle network such as CAN (Controller Area Network) or a dedicated line.

The display 9 is installed in the vicinity of the driver's seat and displays the captured image to the driver. The display 9 includes, for example, a liquid crystal display and a drive circuit thereof and displays the captured image corresponding to the captured image data in which the overlay image data output by the image processor 5 is superimposed. The display 9 displays moving images by continuously displaying the captured image data of the successive frames.

Figure 2:
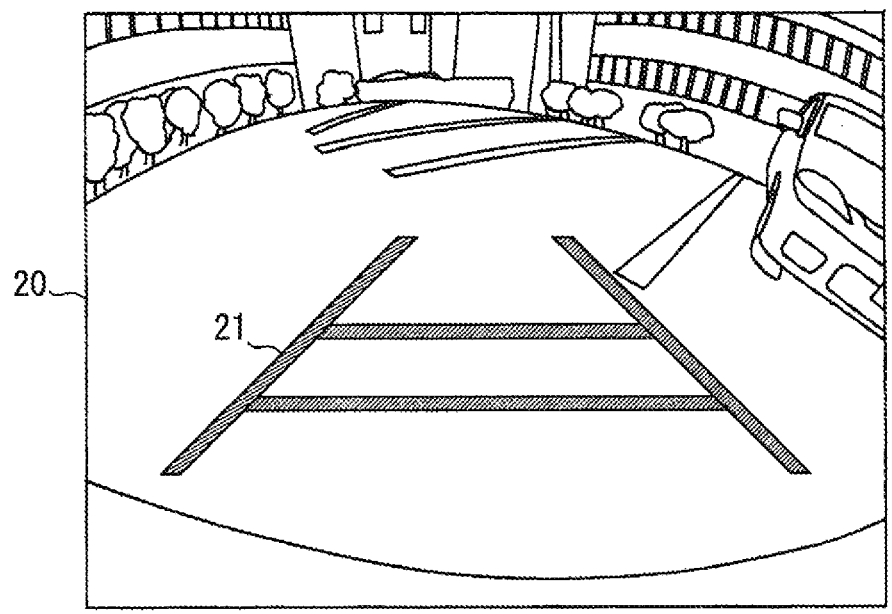
FIG. 2 is a diagram illustrating an example of an overlay image superimposed on a captured image.

FIG. 2 is a diagram illustrating an example of the overlay image superimposed on the captured image. In this example, on a captured image 20 of the surroundings behind the vehicle 20, the guide lines serving as an overlay image 21 are superimposed. The overlay image 21 is superimposed on a predetermined position in the captured image 20. The predetermined position is, for example, a position corresponding to a travelling direction of the vehicle in the captured image 20. The driver, by seeing the overlay image 21, i.e., the guide lines, may recognize the travelling direction of the vehicle in the captured image 20.

FIG. 3 is a diagram illustrating color of the overlay image data. According to the present embodiment, the image processor 5 determines different colors between a first color of the overlay image data of a first frame and a second color of the overlay image data of a second frame following the first frame. For example, when frames of the captured image data input from the imaging unit 3 are assigned with an order, the image processor 5 determines a first color 3a of overlay image data 21a to be superimposed on captured image data 20a of odd frames and a second color 3b of overlay image data 21b to be superimposed on captured image data 20b of even frames. For example, the colors 3a and 3b represent gradation values of a color space, such as an RGB (Red, Green, and Blue) color space, of an image displayed on the display 9. Here, a difference between the color 3a and the color 3b corresponds to a difference in a hatching pattern.

Since images corresponding to the captured image data 20a and the captured image data 20b are alternately displayed, the driver recognize images in which an afterimage of the overlay image of the odd frame and an afterimage of the overlay image of the even frame overlap with each other. At this time, therefore, the driver may recognize a neutral color (e.g., color with an intermediate value of an RGB gradation value) between the overlay image of the odd frame and the overlay image of the even frame. Accordingly, for example, when one of the colors is similar to background color of the captured image and thus hardly visible, as long as opposite color is different from the background color and easily visible, the driver may recognize the overlay image in the neutral color and, regardless of the background color, recognize an original guide line.

Further, when the driver has color blindness and distinguishes a difference in hue as a difference in brightness, the driver may recognize one of the colors that is easier for the driver to do so. Therefore, the driver may recognize an original overlay image in a difficult color by using an afterimage thereof in color which the driver has recognized.

Although in the above description the colors of the overlay image data 21a and 21b are switched by each frame, the colors of the overlay image data 21a and 21b may be switched by a plurality of frames. That is, the overlay image data 21a may be superimposed on m-number of (m is an integer of 2 or higher) first frames and the overlay image data 21b may be superimposed on the following m-number of second frames. Or, the number of first frames and the number of second frames may be different from each other. When the color 3a of the overlay image data 21a and the color 3b of the overlay image data 21b are alternately switched, the driver may recognize the overlay image in the neutral color or in the color easier for the driver to recognize, and thus may recognize the original overlay image.

Further, since the driver may recognize the color from the afterimage, the overlay image data may be superimposed on the same position in the frame. In other words, an area of the captured image to superimpose the overlay image may be minimized, thereby maximizing a visible area of the captured image.

Figure 4:
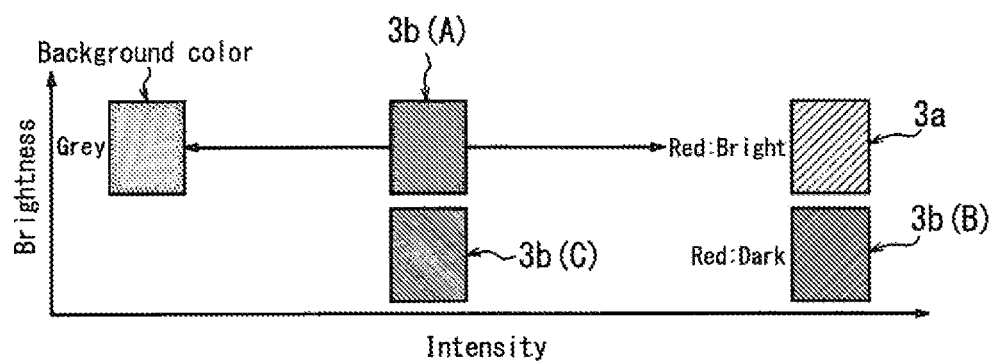
FIG. 4 is a diagram illustrating color of the overlay image data.

According to a preferred mode of the present embodiment, the colors 3a and 3b of the overlay image data 21a and 21b, respectively, are determined to have a difference in at least one of the hue, the brightness, and intensity. For example, provided that the color 3a of the overlay image data 21a is a reference color, when the background color of the captured image is gray and the reference color 3a is red and, the brightness of the background color and that of the reference color 3a coincide with each other, the color 3b opposite to the reference color 3a denoted by 3b(A) in FIG. 4 may have the hue and the brightness same as those of the reference color 3a while having the intensity different from that of the reference color 3a. Or, the color 3b denoted by 3b(B) in FIG. 4 may have the hue and the intensity the same as those of the reference color 3a while having the brightness different from that of the reference color 3a. Or, the color 3b denoted by 3b(C) in FIG. 4 may have the hue the same as that of the reference color 3a while having the intensity and the brightness different from those of the reference color 3a. Or, the color 3b may have the hue, intensity and brightness all different from those of the reference color 3a.

Thereby, the driver may recognize the neutral color between the reference color 3a and the opposite color 3b or the color easier for the driver to recognize and thus recognize the original overlay image.

Figure 5:
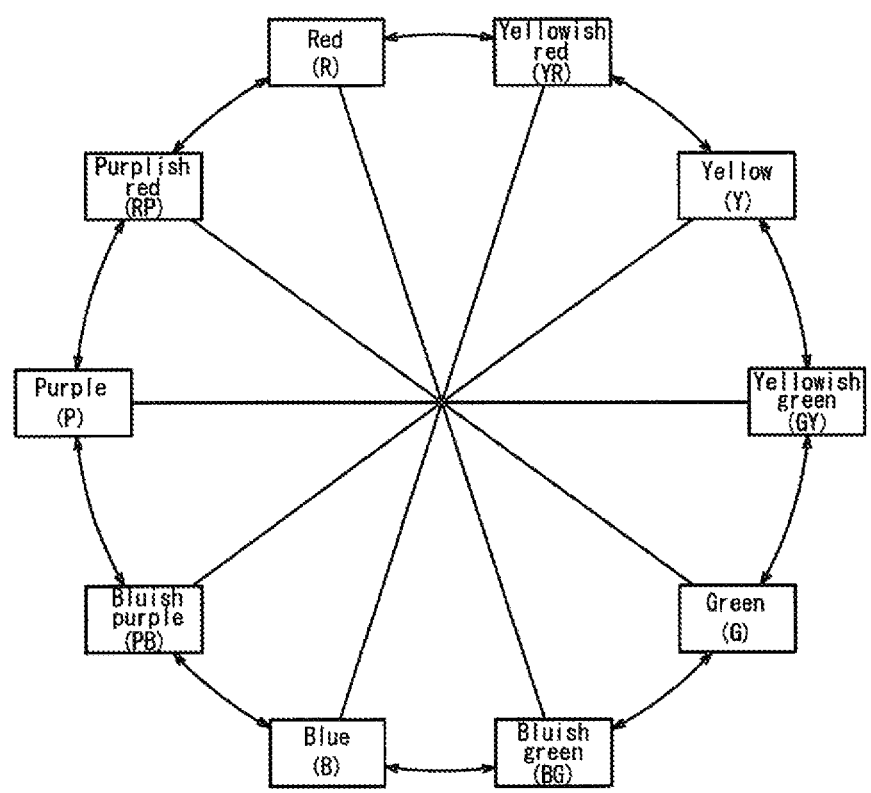
FIG. 5 is a diagram illustrating a Munsell hue circle.

According to a more preferred mode of the present embodiment, the color 3a of the overlay image data 21a and the color 3b of the overlay image data 21b are mutual complementary colors. The complementary colors have a relation to be located opposite to each other in a hue circle. For selection of the hue of the complementary colors, a Munsell hue circle illustrated in FIG. 5, for example, may be used. The Munsell hue circle is divided into ten sections of ten colors including five basic colors (red, yellow, green, blue, and purple) and five neutral colors therebetween (yellowish red, yellowish green, bluish green, bluish purple, and purplish red), and the ten colors are arranged into a circle being sectioned. This hue circle allows a selection of a combination of hues positioned opposite to each other, such as a combination of red and bluish green, a combination of yellowish red and blue, and a combination of yellow and bluish purple. Note that, according to the present embodiment, complementary colors include ones positioned directly opposite to each other as well as ones positioned approximately opposite to each other. For example, the complementary colors may be a combination of red and green or a combination of red and blue. Further, in selection of the complementary colors, other hue data may be used as a matter of course.

Since the color 3a of the overlay image data 21a and the color 3b of the overlay image data 21b are complementary color to each other, when, for example, the driver has the color blindness such as color weakness and distinguishes between the complementary colors by their brightness, the driver may recognize the color which is easier for the driver to do so and thus may recognize the original overlay image.

Figure 6:
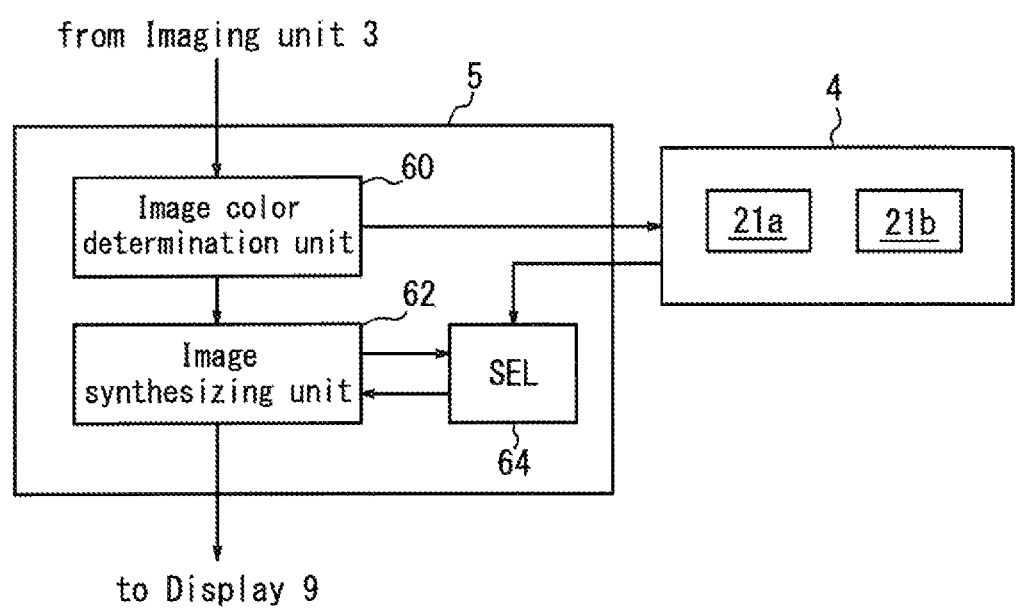
FIG. 6 is a diagram illustrating a detailed configuration of an image processor.

FIG. 6 is a diagram illustrating a detailed configuration of the image processor 5 for conducting the image processing described above. The image processor 5 includes an image color determining unit 60 for determining colors of the overlay image data 21a and 21b and an image synthesizing unit 62 for superimposing the overlay image data 21a and 21b in determined colors on predetermined positions in the captured image data 20a and 20b, respectively, and outputting the resulting data to the display 9. The image color determination unit 60 and the image synthesizing unit 62 may be configured by using, for example, a processor for executing a processing program stored in the memory 4.

For example, the image color determination unit 60 reads the overlay image data 21a upon input of the captured image data 20a of the odd frame, and reads the overlay image data 21b upon input of the captured image data 20b of the even frame, from the memory 4. Here, the memory 4 preliminarily stores the overlay image data 21a and 21b in different colors.

The image synthesizing unit 62 outputs a switching signal according to the order of the frame of the captured image data to a selector 64, such that the selector 64 selects one of the overlay image data 21a and 21b read from the memory 4 and inputs the selected one to the image synthesizing unit 62. For example, the selector 64 inputs the overlay image data 21a to the image synthesizing unit 62 for the odd frame and the overlay image data 21b for the even frame. Then, the image synthesizing unit 62 superimposes the overlay image data 21a and 21b on the predetermined positions in the captured image data 20a and 20b, respectively, and outputs the resulting data one after another to the display 9.

Alternatively, the following configuration is also possible. That is, for example, the image color determination unit 60 determines color of the overlay image data to be superimposed based on the order of the frames of the captured image data. In this case, for example, map data of color combinations may be preliminarily stored in the memory 4 for later read-out. Then, the image color determination unit 60 reads overlay image data in non-specified color from the memory 4 and transmits the overlay image data together with information on determined color to the image synthesizing unit 62. The image synthesizing unit 62, when superimposing the overlay image data on the captured image data, sets the determined color.

Further, the image color determination unit 60 may determine the color of the overlay image data based on the background color around the position on which the overlay image data are superimposed in the captured image data. For example, the image color determination unit 60 acquires color of pixels around the position on which the overlay image data are superimposed in the captured image data. Then, the image color determination unit 60 reads color corresponding to the background color from, for example, the map data of a combination of the background color and the color of the overlay image data and determines the color of the overlay image data. Such map data are preliminarily stored in the memory 4. In the map data, for example, a complementary color of the background color and a reference color of the overlay image data corresponding thereto are associated with each other and, further, the reference color and an opposite color having difference therefrom in at least one of the hue, the brightness, and the intensity are associated with each other.

Figure 7:
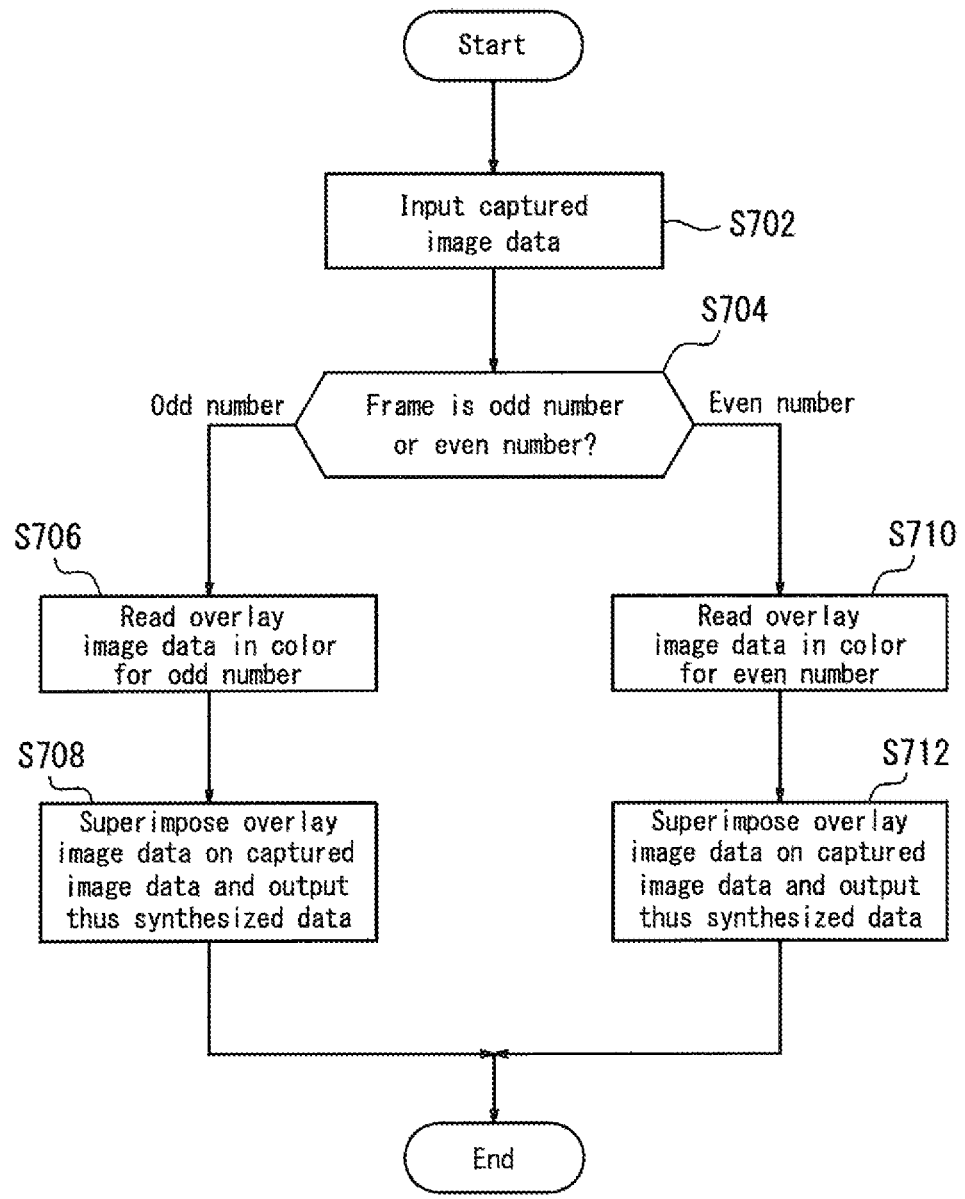
FIG. 7 is a flowchart illustrating an operation procedure of the image processor.

FIG. 7 is a flowchart illustrating an operation procedure of the image processer 5 according to the present embodiment. The procedure illustrated in FIG. 7 is executed, for example, every time the captured image data of one frame are input.

The image color determination unit 60, in response to the captured image data input thereto (S702), determines whether the frame is the odd frame or the even frame (S704). For the odd frame, the image color determination unit 60 reads the overlay image data 21a in the color 3a of the odd frame from the memory 4 (S706). Or, the image color determination unit 60 may set the color 3a of the odd frame to the image synthesizing unit 62. Then, the image synthesizing unit 62 combines the captured image data 20a of the odd frame and the overlay image data 21a in the color 3a and outputs thus synthesized data (S708). For the even frame, on the other hand, the image color determination unit 60 reads the overlay image data 21b in the color 3b of the even frame from the memory 4 (S710). Then, the image synthesizing unit 62 combines the captured image data 20b of the even frame and the overlay image data 21b in the color 3b and outputs thus synthesized data (S712).

Note that in the procedure described above, between S702 and S704, a step that the image color determination unit 60 determines colors of the overlay image data 21a and 21b based on the background color of the captured image data may be inserted. In this case, at S706 and S710, the image color determination unit 60, instead of reading the overlay image data from the memory 4, sets the determined color for the odd frame or the even frame to the image synthesizing unit 62.

According to the present embodiment, as described above, the overlay image that is easily visible regardless of the background color and the driver's color vision may be superimposed on the captured image.

Variation Example

According to a variation example of the present embodiment, the image color determining unit 60 includes a plurality of combinations of the overlay image data 21a and 21b that may be selected by the driver. The combinations are preliminarily stored in the memory 4. According to this variation example, the driver may select, based on driver's taste or color vision, a color combination that is more easily visible to the driver. Thus, the overlay image that is more easily visible to the driver may be superimposed on the captured image.

Figure 8:
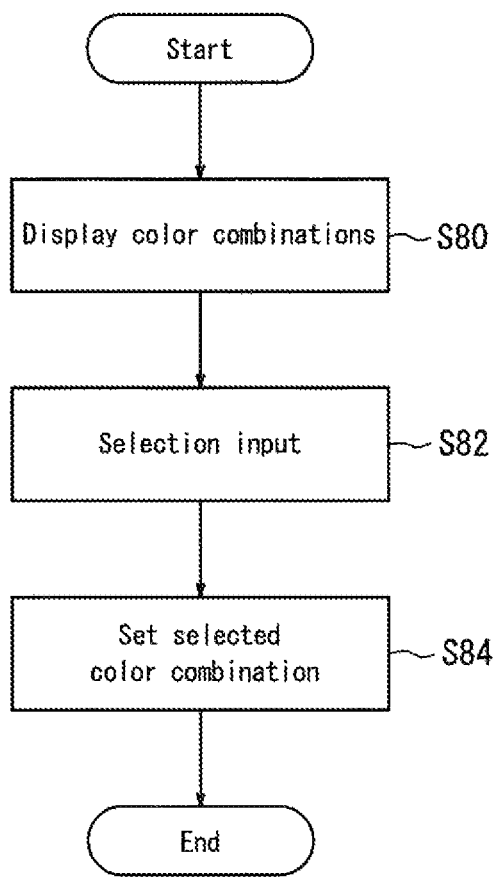
FIG. 8 is a flowchart illustrating a color selection procedure.

FIG. 8 is a flowchart illustrating a color selection procedure. The procedure in FIG. 8 is executed when, for example, the driver inputs an instruction of color settings by using the input device 7. The image color determination unit 60 controls the display 9 to display the combination read from the memory 4 (S80).

FIG. 9 is a diagram illustrating exemplary color combinations to be selected. Each pattern number includes the reference color (for example, color of the odd frame) and the opposite color (color of the even frame) paired with the reference color.

Referring back to FIG. 8, when the driver selects a color combination by using the input device 7 (for example, selects a pattern number in FIG. 9), a signal corresponding to the selection is input to the image color determination unit 60 (S82). In response thereto, the image color determination unit 60 determines the selected color combination as the colors of the overlay image data 21a and 21b (S84).

According to this variation example, the driver may select, based on the driver's taste or color vision, the color combination that is more easily visible to the driver. Thus, the overlay image that is more easily visible to the driver may be superimposed on the captured image.

Although the present invention has been described based on the figures and the embodiments, it is to be understood that various modifications and changes may be implemented based on the present disclosure by those who are ordinarily skilled in the art. Accordingly, such modifications and changes are included in a scope of the present invention. For example, functions and the like included in each means and each step may be rearranged without logical inconsistency, so as to combine a plurality of means or steps together or to divide them.

According to the present embodiments, as described above, the overlay image that is easily visible regardless of the background color and the driver's color vision may to be superimposed on the captured image.

REFERENCE SIGNS LIST

1: drive assisting apparatus
10: imaging apparatus
5: image processer
60: image color determination unit
62: image synthesizing unit
20a, 20b: captured image data
21a, 21b: overlay image data

The invention claimed is:
1. An image processing apparatus comprising:
an image processor configured to determine color of overlay image data to be superimposed on captured image data of successive frames generated by capturing surroundings of a vehicle such that a first color of overlay image data of a first frame differs from a second color of the overlay image data of a second frame following the first frame; and an image synthesizer configured to superimpose the overlay image data in the first color and the overlay image data in the second color respectively on predetermined positions in the captured image data of the first frame and the second frame, and output images corresponding to the captured image data of the successive frames one after another to a display.

2. The image processing apparatus according to claim 1, wherein the first and second colors are determined to have a difference in at least one of hue, brightness, and intensity.

3. The image processing apparatus according to claim 2, wherein the first and second colors are determined to be complementary to each other.

4. The image processing apparatus according to claim 1, wherein the image processor includes a plurality of selectable combinations of the first and second colors.

5. The image processing apparatus according to claim 1, wherein the image processor determines the first color based on color of a captured image.

6. An imaging apparatus comprising:
the image processing apparatus according to claim 1; and
an imager configured to capture surroundings of a vehicle and generating captured image data to be input to the image processing apparatus.

7. A vehicle drive assisting apparatus comprising:
the imaging apparatus according to claim 6; and
a display installed in a vehicle together with the imaging apparatus configured to display images corresponding to captured image data of successive frames output from the imaging apparatus.

8. An image processing method including steps of:
determining color of overlay image data to be superimposed on captured image data of successive frames generated by capturing surroundings of a vehicle such that a first color of overlay image data of a first frame differs from a second color of the overlay image data of a second frame following the first frame;
superimposing the overlay image data in the first color and the overlay image data in the second color respectively on predetermined positions in the captured image data of the first frame and the second frame; and
outputting images corresponding to the captured image data of the successive frames one after another to a display.

* * * * *